United States Patent [19]
Tomikashi et al.

[11] Patent Number: 4,581,731
[45] Date of Patent: Apr. 8, 1986

[54] RECEIVER FOR OPTICAL COMMUNICATION

[75] Inventors: Minoru Tomikashi, Zushi; Norimasa Kishi; Tadashi Suzuki, both of Yokohama; Toru Futami, Yokosuka, all of Japan

[73] Assignee: Nissan Motor Company, Limited, Japan

[21] Appl. No.: 590,499

[22] Filed: Mar. 16, 1984

[30] Foreign Application Priority Data

Jun. 14, 1983 [JP] Japan .................. 58-106478

[51] Int. Cl.$^4$ .............................................. H04B 9/00
[52] U.S. Cl. .......................................... 370/4; 455/619
[58] Field of Search ..................... 370/1, 2, 3, 4; 455/619, 606, 607, 617

[56] References Cited

U.S. PATENT DOCUMENTS 4,027,152  5/1977  Brown et al. ............... 455/619

OTHER PUBLICATIONS

Pettit, J. W., "Self-Level Adjustment in Optical Detector System", *IBM Technical Disclosure Bulletin*, vol. 24, No. 4, Sep. 1981.

*Primary Examiner*—Joseph A. Orsino, Jr.
*Assistant Examiner*—Timothy K. Greer
*Attorney, Agent, or Firm*—Lane and Aitken

[57] ABSTRACT

A receiver is applied to optical communication using an optical pulse signal carrying data which is cyclically updated. The optical signal is converted to a corresponding electrical pulse signal. The data is extracted from the electrical signal. The extracted data from successive cycles are compared. In response to the result of comparison between the data, a determination is made as to the number of cycles in which the extracted data is at a given value. When the determined number of cycles reaches a variable preset number, a previously used data value is replaced by the given value. The amplitudes of the electrical signal pulses are compared with a reference level. The preset number is varied in accordance with the result of comparison between the pulse amplitudes and the reference level.

4 Claims, 7 Drawing Figures

| OLD (0) | OLDER (0) | CONT (0) | ← SLOT (1) |
| OLD (1) | OLDER (1) | CONT (1) | ← SLOT (2) |
| ⋮ | ⋮ | ⋮ | |
| OLD (j−1) | OLDER (j−1) | CONT (j−1) | ← SLOT (j) |

SIGNAL (b)

SIGNAL (c)

SIGNAL (d)

SIGNAL (e)

SIGNAL (f)

4,581,731

RECEIVER FOR OPTICAL COMMUNICATION

BACKGROUND OF THE INVENTION

This invention relates to a receiver for optical communication.

Some optical communication systems use optical pulse or digital signals transmitted from transmitters to receivers. First, the receiver converts these optical signals to corresponding electrical pulse or digital signals. Then, the receiver compares the levels of the electrical signals to references in order to discriminate the states of the received optical signals.

Noise interference can vary the levels of the electrical signals. Such variations in the levels of the electrical signals may cause erroneous communication.

SUMMARY OF THE INVENTION

It is an object of this invention to provide a reliable receiver for optical communication.

In accordance with this invention, a receiver is applied to optical communication using an optical pulse signal carrying data which is cyclically updated. The optical signal is converted to a corresponding electrical pulse signal. The data is extracted from the electrical signal. The extracted data from successive cycles are compared. In response to the result of comparison between the data, a determination is made as to the number of cycles in which the extracted data is at a given value. When the determined number of cycles reaches a variable preset number, a previously used data value is replaced by the given value. The amplitudes of the electrical signal pulses are compared with a reference level. The preset number is varied in accordance with the result of comparison between the pulse amplitudes and the reference level.

DESCRIPTION OF THE PREFERRED EMBODIMENT

Figure 1:
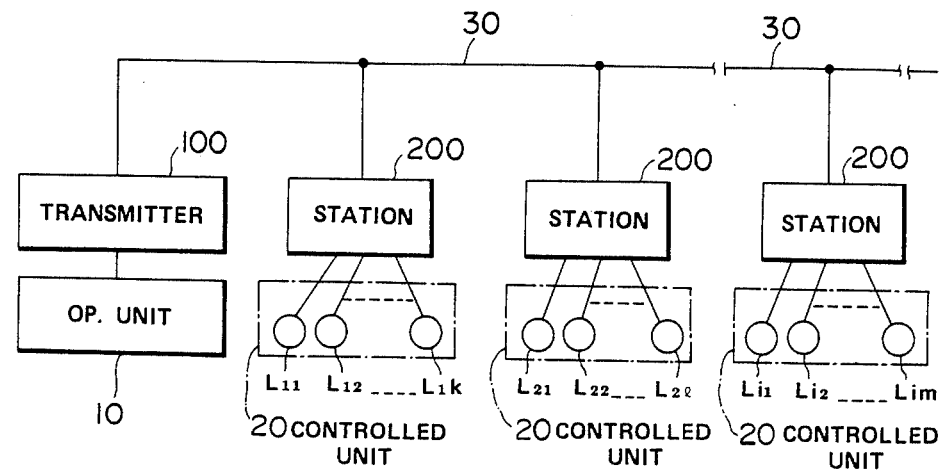
FIG. 1 is a block diagram of an optical communication system including receivers according to this invention.

With reference to FIG. 1, an operating unit 10 is connected to controlled units 20 via an optical communication system including a transmitter 100 and similar receivers 200. These receivers 200 are called as stations hereafter. Optical fibers 30 connect the transmitter 100 and the stations 200.

The operating unit 10 includes switches. Each of these switches serves to generate an electrical control signal in accordance with its position. The operating unit 10 is connected to the transmitter 100 to feed the electrical control signals to the transmitter 100.

The controlled units 20 are connected to the stations 200 respectively. The i-th controlled unit 10 includes controlled devices Li1, Li2, . . . , and Lim, where i=1, 2, . . . n. In the case of application to an automotive vehicle, these controlled devices are headlights, turn indicators, stop indicators, reverse indicators, and the like. Part of the controlled devices in different controlled units can be common.

The transmitter 100 cyclically arranges the electrical control signals in time-division multiplexing and converts the resulting multiplexed electrical signal to a corresponding optical signal. This optical signal carries data reflecting conditions of the operating unit 10 and updated in accordance with variations in the conditions of the operating unit 10. The optical signal is guided by the optical fibers 30 to the stations 200.

Each of the stations 200 converts the optical signal to a corresponding electrical signal. Each station 200 extracts data from this electrical signal to be used to control the associated unit 20. On the basis of the extracted data, the control unit 20 outputs control signals to the associated unit 20 to control the controlled devices in the unit 20.

In this way, the controlled devices in the units 20 are controlled in response to conditions of the operating unit 10.

Figure 2:
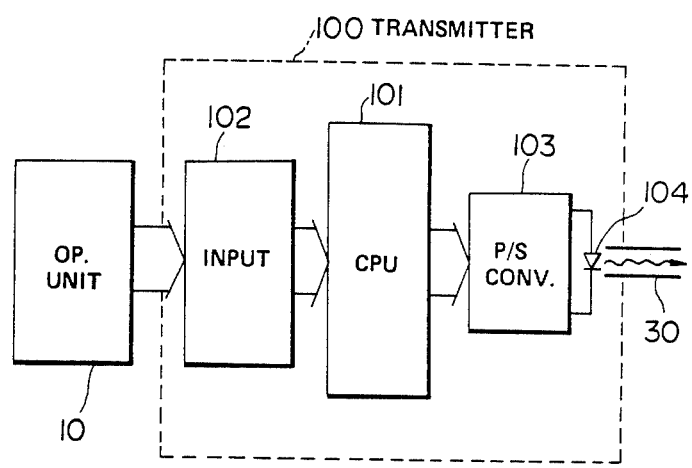
FIG. 2 is a block diagram of the transmitter of FIG. 1.

As shown in FIG. 2, the transmitter 100 includes a digital central processing unit (CPU) 101, an input circuit 102, an output circuit 103, and an electricity-to-photo transducer 104, such as a light-emitting diode. The processing unit 101 and the operating unit 10 are connected and interfaced via the input circuit 102. The processing unit 101 and the light-emitting element 104 are connected and interfaced via the output circuit 103.

A read-only memory (not shown) connected to the central processing unit 101 holds a program which determines operation of the processing unit 101. A random-access memory (not shown) is connected to the processing unit 101 in a conventional way. The processing unit 101 inputs the control signals from the operating unit 10 via the input circuit 102 and processes them before outputting the resulting processed control data signals to the output circuit 103 in a preset order. The processing unit 101 cyclically repeats this operation. Furthermore, the processing unit 101 cyclically outputs a marker or reference signal to the output circuit 103 which represents the start of each cycle of the ordered control data or signals. Each of the control and marker signals supplied to the output circuit 103 is in 8-bit parallel.

The output circuit 103 includes a parallel-to-serial (P/S) converter. This converter 103 transforms the 8-bit parallel control and marker signals into corresponding 8-bit serial control and marker signals. These serial-form signals are cyclically outputted in the preset order to the light-emitting element 104. In this way, the light-emitting element 104 receives a pulse train composed of each cycle of the ordered serial-form signals. The light-emitting element 104 is driven by this pulse train and intermittently emits light in accordance with this pulse train. As a result, the light-emitting element 104 generates an optical pulse signal reflecting the control and marker signals. In other words, this optical signal results from time-division multiplexing of the control and marker signals. The optical signal is guided by the optical fibers 30.

The central processing unit 101 and the parallel-to-serial converter 103 can be composed of a one-chip-type microcomputer "6801" made by Motorola which includes a processing unit, a read-only memory, a random-access memory, a normal input/output circuit, and a particular input/output circuit for serial-form input and output.

Figures 3, 7:
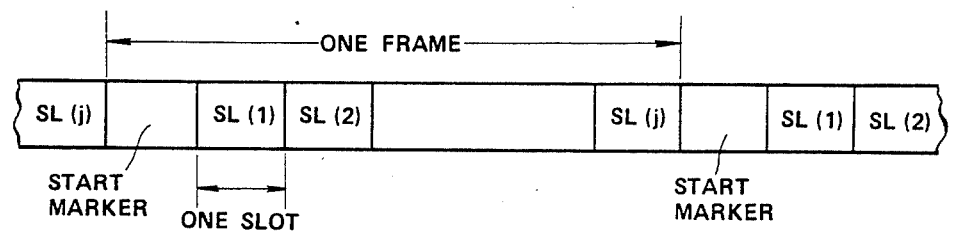
FIG. 3 is a diagram of the multiplexed optical signal used in the system of FIG. 1.
FIG. 7 is a diagram of the arrangement of memory locations in the receiver of FIG. 4.

As shown in FIG. 3, one big cycle or frame of the optical pulse signal is divided into a start time slot and normal time slots SL(1), SL(2), . . . , and SL(j). This frame initiates from the start time slot to which the start marker signal is assigned. The normal time slots SL(1), SL(2), . . . , and SL(j) follow the start time slot in that order. The 8-bit serial control signals are assigned to these time slots SL(1), SL(2), . . . , and SL(j), respectively.

Figure 4:
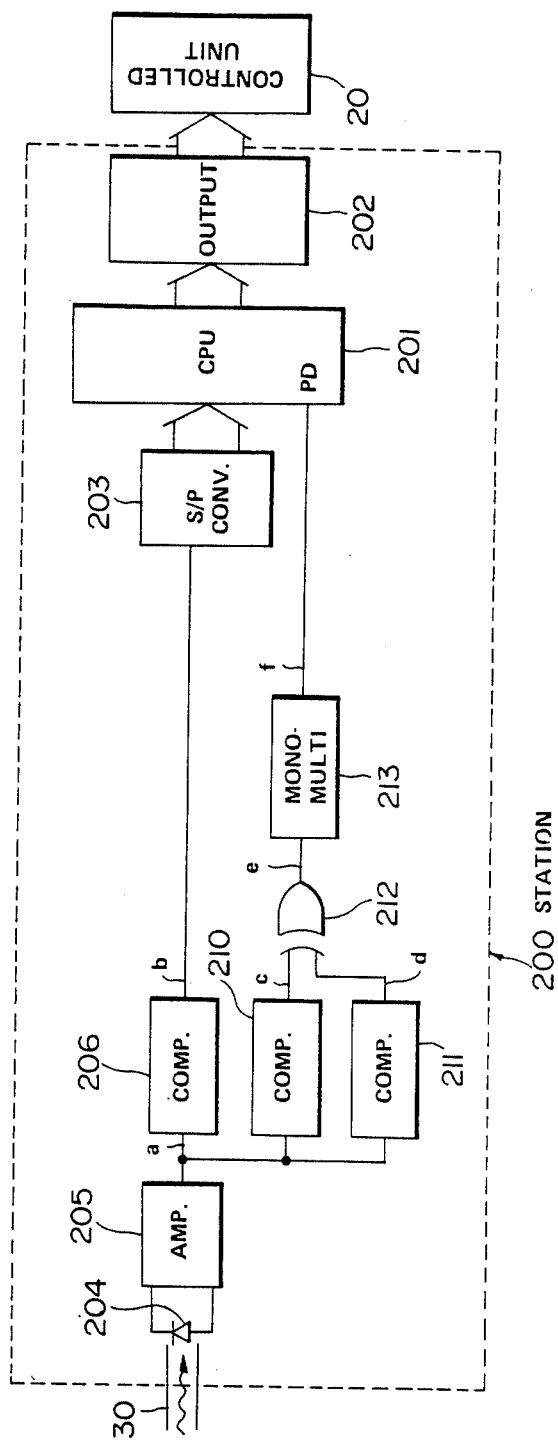
FIG. 4 is a block diagram of one of the receivers in FIG. 1.
Figure 5:
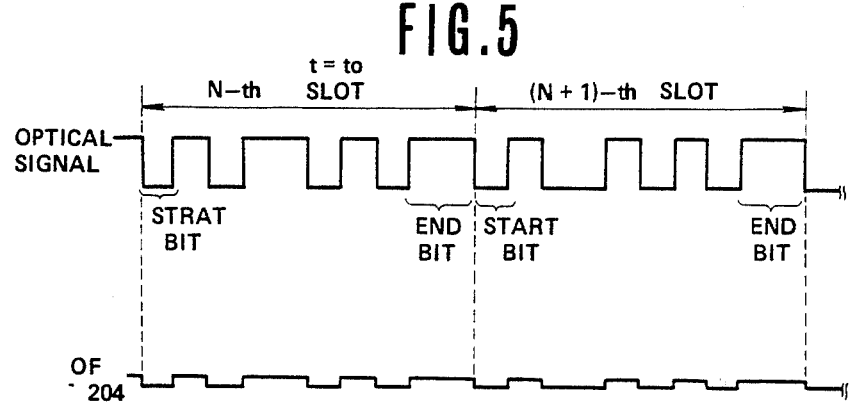
FIG. 5 is a timing diagram of waveforms of several signals in the receiver of FIG. 4.
Figure 5:
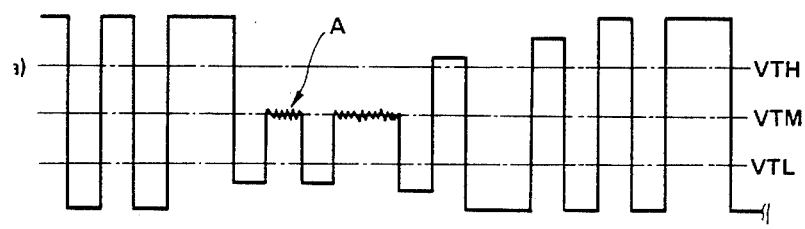
Figure 5:
Figure 5:
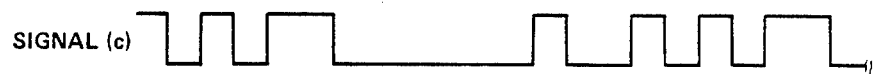
Figure 5:
Figure 5:
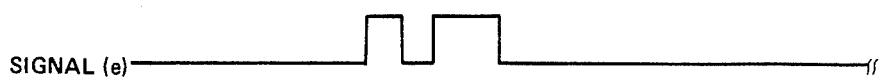
Figure 5:

FIG. 4 shows the details of one station 200. The station 200 includes a photo-to-electricity transducer 204, such as a photodiode or phototransistor. This light-sensitive element 204 receives the optical signal guided by the optical fibers 30 and converts the optical signal into a corresponding electrical signal. As shown in FIG. 5, the level of the electrical outut from the light-sensitive element 204 varies in accordance with variations in the intensity of the optical signal.

An input terminal of an amplifier 205 is connected to the light-sensitive element 204 to receive the output from the element 204. As shown by a signal a in FIG. 5, the amplifier 205 magnifies the output from the light-sensitive element 204.

A first input terminal of a first comparator 206 is connected to the output terminal of the amplifier 205. A second input terminal of the comparator 206 is supplied with a first reference voltage VTM chosen to be approximately half the level of normal peaks of the output signal a from the amplifier 205. The comparator 206 compares the signal a from the amplifier 205 with the reference voltage VTM. As shown in FIG. 5, the output signal b from the comparator 206 is high when the signal a from the amplifier 205 exceeds the reference voltage VTM, and remains low otherwise. In this way, the comparator 206 shapes the signal a from the amplifier 205 into pulses of equal amplitudes. From another standpoint, the comparator 206 serves to discriminate the states of the signal a from the amplifier 205.

A digital central processing unit (CPU) 201 and the comparator 206 are connected and interfaced via an input circuit 203. The processing unit 201 and the controlled unit 20 are connected and interfaced via an output circuit 202.

The input circuit 203 includes a serial-to-parallel (S/P) converter. This converter 203 transforms the serial data signal from the comparator 206 into corresponding parallel data signals, which are fed to the processing unit 201.

A first input terminal of a second comparator 210 is connected to the output terminal of the amplifier 205. A second input terminal of the comparator 210 is supplied with a second reference voltage VTH chosen to be higher than the first reference voltage VTM. The comparator 210 compares the signal a from the amplifier 205 with the second reference voltage VTH. As shown in FIG. 5, an output signal c from the comparator 210 is high when the signal a from the amplifier 205 exceeds the second reference voltage VTH, and remains low otherwise.

A first input terminal of a third comparator 211 is connected to the output terminal of the amplifier 205. A second input terminal of the comparator 211 is supplied with a third reference voltage VTL chosen to be lower than the first reference voltage VTM. The comparator 211 compares the signal a from the amplifier 205 with the third reference voltage VTL. As shown in FIG. 5, an output signal d from the comparator 211 is high when the signal a from the amplifier 205 exceeds the third reference voltage VTL, and remains low otherwise.

A first input terminal of an EXCLUSIVE OR gate 212 is connected to the output terminal of the second comparator 210. A second input terminal of the gate 212 is connected to the output terminal of the third comparator 211. As shown in FIG. 5, an output signal e from the gate 212 is high when only one of the signals c and d from the comparators 210 and 211 is high, and remains low otherwise.

The combination of the comparators 210 and 211, and the gate 212 serves to pick out pulses from the output of the amplifier 205 which have amplitudes between the second and third reference voltages VTH and VTL (see FIG. 5).

An input terminal of a retriggerable monostable multivibrator 213 is connected to the output terminal of the gate 212. As shown by a signal f in FIG. 5, the multivibrator 213 is triggered by the positive-going edge of each pulse from the gate 212. When the multivibrator 213 is triggered, the output signal f from the multivibrator 213 goes low. The output of the multivibrator 213 remains low for a preset duration chosen to be several times the period of each of the time slots SL(j). When the preset duration expires, the output signal f from the multivibrator 213 normally returns to a high level. The output signal f from the multivibrator 213 reports that the amplitudes of pulses from the amplifier 205 reduce below a normal level defined by the reference voltage VTH. The output terminal of the multivibrator 213 is connected to an input port PD of the processing unit 201.

The amplitudes of the pulses from the amplifier 205 normally exceed the highest reference level VTH. In this normal case, the signals c and d from the comparators 210 and 211 coincide. As a result, the output signal e from the gate 212 remains high and informs the processing unit 201 that the amplitudes of pulses from the amplifier 205 are normal.

When the amplitudes of the pulses from the amplifier 205 reduce below the highest reference level VTH but above the lowest reference level VTL, as indicated by the arrow A in FIG. 5, due to noise interferences, the signal c and d from the comparators 210 and 211 differ. As a result, the gate 212 output pulses corresponding to the reduced pulses from the amplifier 205 and triggers the multivibrator 213. When the multivibrator 213 is triggered, the output signal f from the multivibrator 213 goes low and informs the processing unit 201 that the amplitudes of the pulses from the amplifier 205 reduce below the normal level. In this case, as shown in FIG. 5, there is possibility that the output signal b from the comparator 206 can not precisely reflect the output signal a from the amplifier 205 with respect to pulse-shaped information. The output signal f from the multivibrator 213 remains low for at least the preset duration.

If the amplitudes of the subsequent pulses from the amplifier 205 return to above the highest reference level VTH, the output signal f from the multivibrator 213 will return to the high level at the moment of end of the preset duration starting from the final triggering of the multivibrator 213 and then continue to be at the high level.

As long as the amplitudes of the subsequent pulses from the amplifier 205 remain between the reference levels VTH and VTL, the gate 212 outputs pulses to the multivibrator 213 so that the multivibrator 213 is triggered repeatedly at short intervals. As a result, the output signal f from the multivibrator 213 continues to be at the low level.

Hysteresis may be provided to switching action of the first comparator 206. In this case, the highest and lowest reference voltages VTH and VTL are preferably chosen to be slightly above and below the voltage range of hysteresis respectively.

A read-only memory (not shown) connected to the central processing unit 201 holds a program which determines operation of the processing unit 201. A random-access memory (not shown) is connected to the processing unit 201 in a conventional way. The processing unit 201 and the serial-to-parallel converter 203 can be composed of a one-chip-type microcomputer "6801" made by Motorola.

Figure 6:
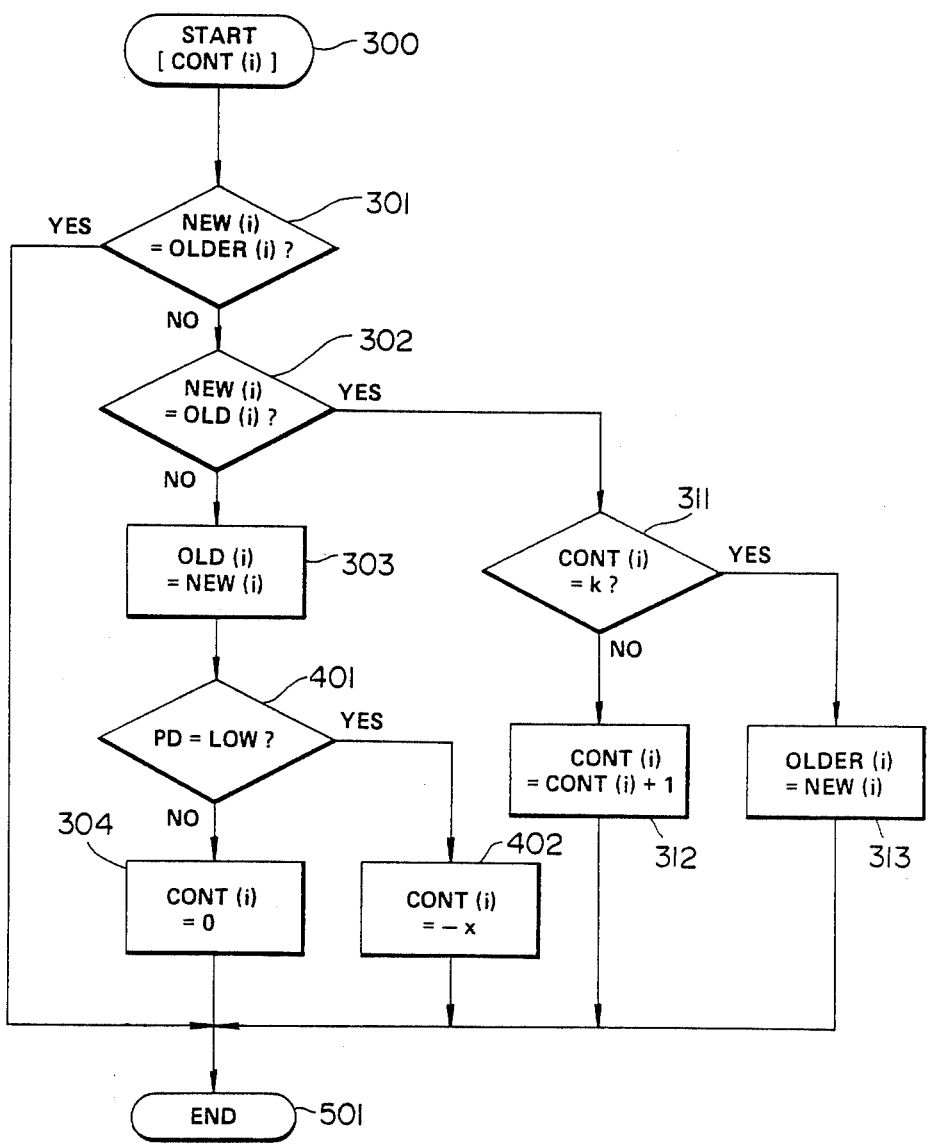
FIG. 6 is a flowchart of a program determining operation of the central processing unit of FIG. 4.

FIG. 6 is an essential portion of flowchart of the program determining operation of the central processing unit 201. NEW(i) indicates a variable corresponding to a memory location which holds data in the i-th time slot SL(i) in the frame of the latest cycle of the output from the comparator 206 reflecting the optical signal. OLD(i) indicates a variable corresponding to a memory location which holds data in the i-th time slot SL(i) in the frame of the immediately preceding cycle of the output from the comparator 206. OLDER(i) indicates a variable corresponding to a memory location which holds data in respect of the i-th time slot SL(i) actually used in controlling the controlled unit 20. Specifically, on the basis of the data in the variable OLDER(i), the processing unit 201 supplies control signals to the controlled devices in the unit 20 via the output circuit 202 in order to control the controlled devices. CONT(i) indicates a variable corresponding to a memory location which holds integer data representing the interation times of execution of a loop part of the program with respect to the data in the i-th time slot(i). Note that i=1, 2, ... j.

As shown in FIG. 7, memory locations for storing data in the variables OLD(i), OLDER(i), and CONT(i) are addressed in accordance with the time slots SL(i).

Returning to FIG. 6, in a first step 301 after a start step 300, the data in the variable NEW(i) is comparted to the data in the variable OLDER(i). If the data in the variable NEW(i) equals the data in the variable OLDER(i), that is, the data in the i-th slot SL(i) has unchanged, the program proceeds to an end step 501. If the data in the variable NEW(i) differs from the data in the variable OLDER(i), the program proceeds to a step 302.

In the step 302, the data in the variable NEW(i) is compared to the data in the variable OLD(i). If the data in the variable NEW(i) differs from the data in the variable OLD(i), that is, if the data in the i-th slot SL(i) has just changed, the program proceeds to a step 303. If the data in the variable NEW(i) equals the data in the variable OLD(i), the program proceeds to a step 311.

In the step 303, the data in the variable OLD(i) is updated by replacing it with the data in the variable NEW(i). This is realized by a statement "OLD(i)=-NEW(i)".

In a step 401 subsequent to the step 303, the level at the input port PD, that is, the level of the output signal f from the multivibrator 213, is determined. If this level is high, that is, the amplitudes of pulses from the amplifier 205 are relatively great, the program proceeds to a step 304. If this level is low, that is, the amplitudes of pulses from the amplifier 205, are relatively small, the program proceeds to a step 402.

In the step 304, the integer count data in the variable CONT(i) is cleared to zero. After the step 304, the program proceeds to the end step 501.

In the step 402, the integer count data in the variable CONT(i) is initialized to $-X$, where X is a preset integer $\geq 1$. After the step 402, the program proceeds to the end step 501.

In the step 311, the integer count data in the variable CONT(i) is compared to a preset positive integer k. If the integer in the variable CONT(i) differs from the preset integer k, the program proceeds to a step 312. If the integer in the variable CONT(i) equals the preset integer k, the program proceeds to a step 313.

In the step 312, the integer count data in the variable CONT(i) is updated by replacing it with the present integer plus one. This is realized by the statement "CONT(i)=CONT(i)+1". After the step 312, the program proceeds to the end step 501.

In the step 313, the data in the variable OLDER(i) is updated by replacing it with the data in the variable NEW(i). This is realized by the statement "OLDER(i)=NEW(i)". After the step 313, the program proceeds to the end step 501.

The program in the flowchart of FIG. 6 is repeatedly executed in synchronism with each big cycle or frame of the optical signal on the basis of the start marker signal included therein.

In the case where the data in the i-th slot SL(i) has changed to new values and then remain at these new values until the integer count data in the variable CONT(i) increases to the preset integer k, these new values are written in the variable OLDER(i) and are thereby actually used in controlling the controlled unit 20 in place of previously used values. To change the data in the variable OLDER(i) actually used in controlling the controlled unit 20, the data in the i-th slot SL(i) is necessary to remain at these new values for a length of time greater than the time interval (k+1-l)-times the duration of each time slot, where l is the initial value of the variable CONT(i). During this length of time, the comparison between the data in the variables NEW(i) and OLDER(i) is repeated at least (k+1-l)-times.

Under conditions where the output signal f from the multivibrator 213 is high, that is, where the amplitudes of the pulses from the amplifier 205 are relatively great, the count initial value l is set to zero if the data in the time slot SL(i) has changed.

Under conditions where the output signal f from the multivibrator 213 is low, that is, where the amplitudes of the pulses from the amplifier 205 are relatively small, the count initial value l is set to $-X$ if the data in the time slot SL(i) has changed. In order that the data in the variable OLDER(i) actually used in controlling the controlled unit 20 changes, the data in the slot SL(i) is necessary to remain at the new values for at least a length of time greater than, by a time interval X-times the duration of each time slot, the case where the output signal f from the multivibrator 213 is low, that is, where the amplitudes of the pulses from the amplifier 205 are relatively great. During this length of time, the comparison between the data in the variables NEW(i) and OLDER(i) is repeated more times than the case where the amplitudes of the pulses from the amplifier 205 are relatively great. This increased number of comparison can compensate for a reduction of reliability in extracting the data from the optical signal when the amplitudes of the pulses from the amplifier 205 are relatively small.

The program in the flowchart of FIG. 6 is repeatedly executed for each i, that is, each time slot.

The amplitudes of pulses from the amplifier 205 may be compared to more closely arranged references VTH1, VTH2, VTH3, . . . , VTL1, VTL2, . . . , VTL3, the number of which is more than two. In this case, the value X should depend on sections defined by these references in which the amplitudes of pulses from the amplifier 205 reside.

At least one of the values k and X may depend on the time slot SL(i) in order to meet different-speed requirements in transmission of different data from the operating unit 10 to the controlled unit 20.

The data in the variable OLDER(i) may be changed in the case where new data appears more than a preset times in a preset number of cycles or frames.

The number of bits in each time slot may differ from 8. For example, each time slot may have only one bit. In this case, the data in the same bit in successive cycles are compared and the times of coincidence of the data are referred to a preset number depending on each bit.

What is claimed is:

1. A receiver for optical communication using an optical pulse signal carrying data which is updated periodically, the receiver comprising:
   (a) means for converting the optical signal to a corresponding electrical pulse signal including pulses having amplitudes;
   (b) means for extracting the data from the electrical signal;
   (c) means for storing the extracted data;
   (d) means, responsive to the extracting means and storing means, for comparing data currently extracted by said extracting means with data stored by said storing means and extracted by said extracting means in a preceeding period;
   (e) means, responsive to the result of comparison between the data, for determining the number of successive periods in which the extracted data remains at a given value;
   (f) means for replacing a previously stored data value with a current value corresponding to the currently extracted data when the number of periods determined by said determining means reaches a variable preset number;
   (g) means for comparing the amplitudes of the electrical signal pulses with a reference level; and
   (h) means for varying the preset number in accordance with the result of comparison between the pulse amplitudes and the reference level by said comparing means.

2. A receiver as recited in claim 1, wherein the varying means increases the preset number when the amplitudes of the pulses decrease below the reference level.

3. A receiver as claimed in claim 1, wherein the determining means determines the number of cycles for which the extracted data remains at the given value.

4. A receiver for time-division multiplexed optical communication in which M-bit serial data is carried in each time slot of a cyclically transmitted, time-division multiplexed optical signal having the number N of time slots in each cycle so that N-kinds of the data are cyclically transmitted, where M is an integer equal to or greater than one and N is an integer equal to or greater than two, the receiver comprising:
   (a) means for converting the time-division multiplexed optical signal into a corresponding time-division multiplexed electrical signal having amplitudes;
   (b) binary means for converting the electrical signal into a binary signal on the basis of a preset threshold level and thereby detecting the data carried thereon;
   (c) means for determining the amplitudes of the electrical signal with respect to a predetermined reference level;
   (d) means for determining whether or not the detected time-division multiplexed data detected by said binary means in the same time slot in the latest successive cycles of said optical signal coincide with each other whenever the time-division multiplexed data in each cycle is detected by the binary means;
   (e) means for determining the number of times of determination in which the data consecutively remain coincident for each time slot;
   (f) means for setting a reference number for the number of times of consecutively coincident determination on the basis of the determination as to the amplitudes of the electrical signal with respect to the predetermined reference level; and
   (g) means for, when the number of times of consecutively coincident determination by said determining means exceeds the reference number set by setting means, judging the data detected by said binary means to be correct.

* * * * *